US009003004B2

(12) United States Patent
Cho et al.

(10) Patent No.: US 9,003,004 B2
(45) Date of Patent: Apr. 7, 2015

(54) GROUP-BASED CONTROL METHOD AND APPARATUS FOR MTC DEVICES IN MOBILE COMMUNICATION SYSTEM

(75) Inventors: Songyean Cho, Seoul (KR); Heetae Roh, Seongnam-si (KR); Jangwon Lee, Seoul (KR); Beomsik Bae, Suwon-si (KR); Chaegwon Lim, Seoul (KR); Sangsoo Jeong, Suwon-si (KR)

(73) Assignees: Samsung Electronics Co., Ltd., Suwon-si (KR); Industry-Academic Cooperation Foundation, Yonsei University, Seoul (KR)

( * ) Notice: Subject to any disclaimer, the term of this patent is extended or adjusted under 35 U.S.C. 154(b) by 212 days.

(21) Appl. No.: 13/402,146

(22) Filed: Feb. 22, 2012

(65) Prior Publication Data

US 2012/0209978 A1    Aug. 16, 2012

(30) Foreign Application Priority Data

Feb. 22, 2011    (KR) .......................... 10-2011-0015353

(51) Int. Cl.

| G06F 15/173 | (2006.01) |
|---|---|
| H04W 60/04 | (2009.01) |
| H04W 4/00 | (2009.01) |
| H04W 8/04 | (2009.01) |
| H04W 8/18 | (2009.01) |
| H04W 28/02 | (2009.01) |

(52) U.S. Cl.
CPC .............. *H04W 60/04* (2013.01); *H04W 4/005* (2013.01); *H04W 8/04* (2013.01); *H04W 8/186* (2013.01); *H04W 28/0215* (2013.01); *H04W 28/0268* (2013.01)

(58) Field of Classification Search
None
See application file for complete search history.

(56) References Cited

U.S. PATENT DOCUMENTS

| 8,085,731 | B2 * | 12/2011 | Zhao et al. .................... 370/331 |
|---|---|---|---|
| 8,218,436 | B2 * | 7/2012 | Zhao et al. .................... 370/230 |
| 8,295,174 | B2 * | 10/2012 | Wu et al. ....................... 370/233 |
| 2006/0121217 | A1 * | 6/2006 | Childs et al. ................ 428/34.1 |
| 2007/0288208 | A1 * | 12/2007 | Grigsby et al. .................... 703/2 |
| 2009/0052384 | A1 * | 2/2009 | Zisimopoulous et al. .... 370/329 |
| 2009/0086705 | A1 * | 4/2009 | Zisimopoulos et al. ...... 370/347 |
| 2009/0225719 | A1 * | 9/2009 | Zhi et al. ....................... 370/329 |
| 2009/0238207 | A1 * | 9/2009 | Zhao et al. .................... 370/468 |
| 2009/0245108 | A1 * | 10/2009 | Wu et al. ....................... 370/233 |
| 2009/0316656 | A1 * | 12/2009 | Zhao et al. .................... 370/331 |
| 2010/0110989 | A1 * | 5/2010 | Wu et al. ....................... 370/328 |
| 2010/0118781 | A1 * | 5/2010 | Petrovic et al. ............... 370/328 |
| 2010/0120459 | A1 * | 5/2010 | Delaval ......................... 455/509 |
| 2010/0284278 | A1 * | 11/2010 | Alanara ........................ 370/235 |
| 2010/0315988 | A1 * | 12/2010 | Chen ............................. 370/312 |
| 2012/0093129 | A1 * | 4/2012 | Zhao et al. .................... 370/331 |
| 2013/0215793 | A1 * | 8/2013 | Cutler et al. .................. 370/259 |
| 2013/0272123 | A1 * | 10/2013 | Lee et al. ...................... 370/230 |

* cited by examiner

*Primary Examiner* — Ninos Donabed
(74) *Attorney, Agent, or Firm* — Jefferson IP Law, LLP (57) ABSTRACT

A group-based control method and a group-based control apparatus for Machine Type Communication (MTC) devices in a mobile communication system are provided. The method includes sending, when an attach request from an MTC device is received by a Mobility Management Entity (MME), an attach report to a Home Subscriber Server (HSS), starting, upon reception of the attach report by the HSS, a timer lasting for a preset time duration, counting the number of MTC devices requesting attachment and the number of already attached MTC devices during the preset time duration, determining, upon expiration of the timer, by the HSS, an Access Point Name-Aggregate Maximum Bit Rate (APN-AMBR) in consideration of a sum of the counted number of MTC devices requesting attachment during the preset time duration and the counted number of already attached MTC devices, and sending, by the HSS, the determined APN-ABMR to the MME.

14 Claims, 8 Drawing Sheets

GROUP-BASED CONTROL METHOD AND APPARATUS FOR MTC DEVICES IN MOBILE COMMUNICATION SYSTEM

PRIORITY

This application claims the benefit under 35 U.S.C. §119(a) of a Korean patent application filed on Feb. 22, 2011 in the Korean Intellectual Property Office and assigned Serial No. 10-2011-0015353, the entire disclosure of which is hereby incorporated by reference.

BACKGROUND OF THE INVENTION

1. Field of the Invention

The present invention relates to group-based control of Machine Type Communication (MTC) devices. More particularly, the present invention relates to a method and apparatus that controls data traffic generated by a group of MTC devices in a mobile communication system by determining an Aggregate Maximum Bit Rate (AMBR) for each device in the MTC group in consideration of the number of devices requesting attachment and the number of already attached devices in the MTC group.

2. Description of the Related Art

In recent years, there have been rapid advances in wireless communication technologies. For example, early mobile communication systems generally only provided voice services to users in motion. However, modern mobile communication systems provide not only voice services but also data services. In particular, modern mobile communication systems provide users with high-speed data services. However, ever increasing user demands for more resources and higher speed have encouraged development of more advanced mobile communication systems.

Recently, active research has been conducted on Machine Type Communication (MTC) devices. Examples of MTC devices include vending machines, and various home appliances.

To transmit data in a mobile communication system such as the Long Term Evolution (LTE) system, an MTC device performs a network attach procedure. When bit rates generated by many MTC devices performing the attach procedure are not adequately regulated, network congestion may be caused.

Therefore, a need exists for a system and a method that can limit the aggregate bit rate of traffic generated by MTC devices performing data transmission.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a method and apparatus that regulate the maximum bit rate generated by a group of Machine Type Communication (MTC) devices by determining an aggregate maximum bit rate for each device in the MTC group in consideration of the number of devices requesting attachment and the number of already attached devices in the MTC group.

In accordance with an aspect of the present invention, a method for controlling MTC devices in a mobile communication system is provided. The method includes sending, when an attach request from an MTC device is received by a Mobility Management Entity (MME), an attach report to a Home Subscriber Server (HSS), starting, upon reception of the attach report by the HSS, a timer lasting for a preset time duration, counting the number of MTC devices requesting attachment and the number of already attached MTC devices during the preset time duration, determining, upon expiration of the timer, by the HSS, an Access Point Name Aggregate Maximum Bit Rate (APN-AMBR) in consideration of a sum of the number of MTC devices requesting attachment during the preset time duration and the counted number of already attached MTC devices, and sending, by the HSS, the determined APN-ABMR to the MME.

In accordance with another aspect of the present invention, a Mobility Management Entity (MME) for controlling MTC devices in a mobile communication system is provided. The MME includes an interface unit for providing an interface for accessing entities in the mobile communication system, and a control unit for sending, when an attach request from an MTC device is received, an attach report to an HSS, for receiving an APN-AMBR from the HSS, and for forwarding the received APN-AMBR to related entities, wherein, to determine the APN-AMBR, the HSS divides a group-APN-AMBR assigned to an MTC group to which the MTC device belongs by a sum of the number of MTC devices requesting attachment and the number of already attached MTC devices, counted during a preset time duration of a timer.

In accordance with another aspect of the present invention, a Home Subscriber Server (HSS) for controlling MTC devices in a mobile communication system is provided. The HSS includes an interface unit for providing an interface for accessing entities in the mobile communication system, and a control unit for controlling a process of starting, upon reception of an attach report from a Mobility Management Entity (MME), a timer lasting for a preset time duration, for counting the number of MTC devices requesting attachment and the number of already attached MTC devices during the preset time duration, for determining, upon expiration of the timer, an APN-AMBR in consideration of a sum of the counted number of MTC devices requesting attachment during the preset time duration and the counted number of already attached MTC devices, and sending the determined APN-ABMR to the MME.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The description of exemplary embodiments of the present invention is focused on a Long Term Evolution (LTE) system of the Third Generation Partnership Project (3GPP) or the LTE-Advanced system supporting carrier aggregation. However, it should be understood by those skilled in the art that the subject matter of the present invention or variations thereof is applicable to other communication systems having similar technical backgrounds and types of channels.

In the description of exemplary embodiments of the present invention, the terms User Equipment (UE), Machine Type Communication (MTC) device, and MTC terminal may be used interchangeably.

In the LTE communication system, Quality of Service (QoS) parameters such as Maximum Bit Rate (MBR) and Aggregate Maximum Bit Rate (AMBR) are specified to regulate the bit rate of a mobile terminal or a User Equipment. For example, the MBR is used to regulate the bit rate of traffic generated through one guaranteed bit rate (GBR) bearer, and the AMBR is used to regulate the bit rate of all traffic generated through a group of non-GBR bearers.

Two types of AMBR specified by 3GPP are as follows.

Figure 7:
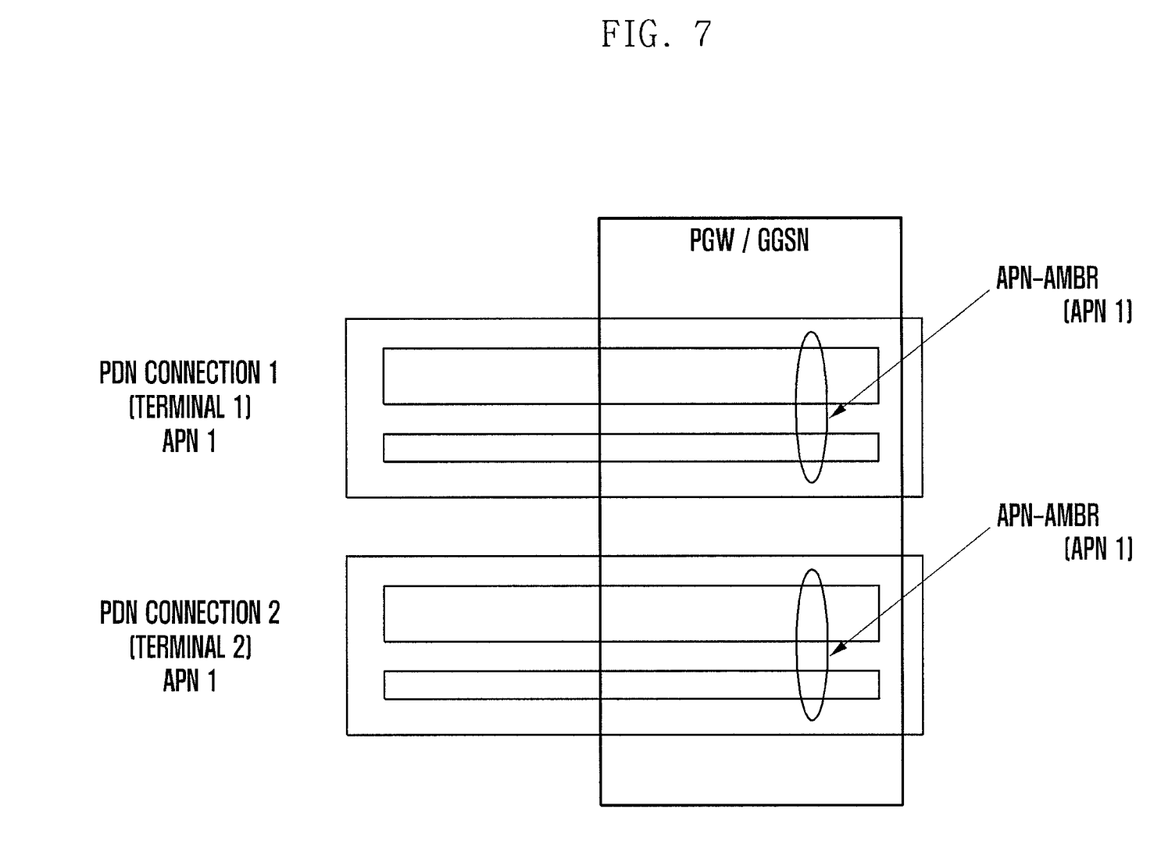
FIGS. 7 and 8 illustrate a comparison between an Access Point Name-Aggregate Maximum Bit Rate (APN-AMBR) and a group-APN-AMBR according to an exemplary embodiment of the present invention.

1. Access Point Name-Aggregate Maximum Bit Rate (APN-AMBR): regulates the total bit rate of traffic generated through all non-GBR bearers connected to the same Access Point Name (APN). For example, FIG. 7 provides an illustration of an APN-AMBR.

2. User Equipment-Aggregate Maximum Bit Rate (UE-AMBR): regulates the total bit rate of traffic generated through all non-GBR bearers of one User Equipment.

As an example, congestion in a radio access network or the core network may be controlled by properly configuring MBRs and AMBRs for GBR bearers and non-GBR bearers. Exemplary embodiments of the present invention provide a scheme for substantially reducing or preventing network congestion, in which the maximum bit rate of all traffic generated by a group of MTC devices is limited by properly configuring QoS parameters for MTC devices in the group.

In addition, 3GPP proposes several MTC features for various MTC applications running on MTC devices. According to exemplary embodiments of the present invention, MTC applications with a time controlled feature and MTC applications with an offline small data transmission feature may be provided.

For example, an MTC application with a time controlled feature is associated with the following preset time periods.

1. Grant time interval: the network permits an MTC device to transmit data during the grant time interval, and prevents the MTC device from transmitting data outside the grant time interval.

2. Forbidden time interval: the network does not permit an MTC device to transmit data during the forbidden time interval for various reasons, such as maintenance of the MTC server.

As an example, the grant time interval does not overlap with the forbidden time interval.

According to a 3GPP system, the Mobility Management Entity (MME) of a local network operator may change the grant time interval in consideration of traffic conditions. The MME may change the grant time interval so that it does not overlap with the forbidden time interval.

According to exemplary embodiments of the present invention, the MTC device control scheme is designed to handle both MTC devices operated by MTC applications with a time controlled feature, and MTC devices operated by MTC applications without a time controlled feature.

As an example, an MTC device with an offline small data transmission feature remains in the detached state before data transmission. To transmit data, the MTC device has to perform an attach procedure. The MTC device performs data transmission in the attached state. After data transmission, the MTC device transitions back to the detached state. That is, each MTC device performs the attach procedure to transmit data, and remains in the detached state at other times.

MTC devices performing the attach procedure without bit rate limitations may cause network congestion. Hence, exemplary embodiments of the present invention provide a scheme for limiting the aggregate bit rate of all traffic generated when MTC devices perform data transmission.

Figure 8:
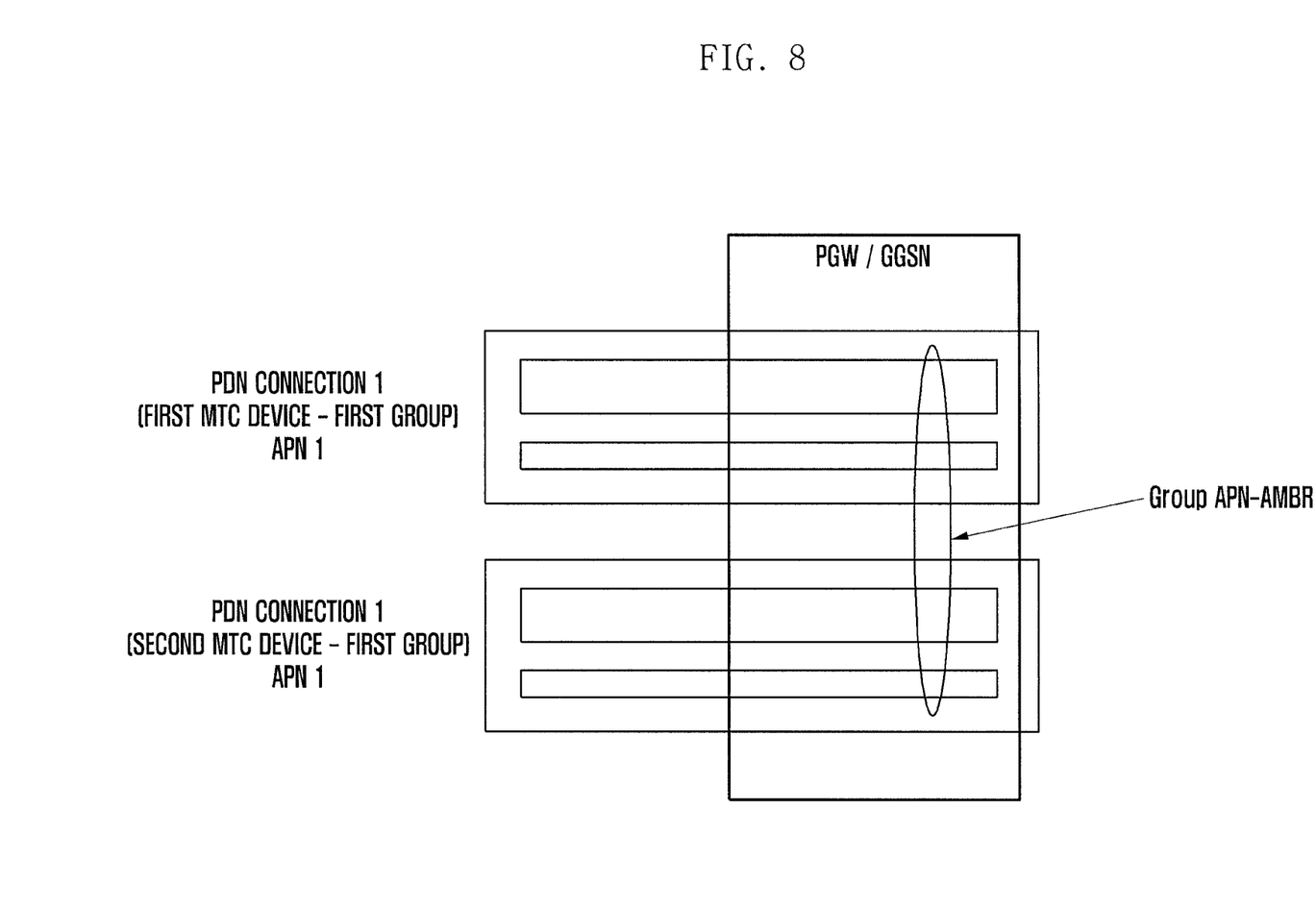

In regular MTC communication, each MTC device sends and receives a small amount of data to and from an MTC server. Although a single MTC device generates traffic of a low bit rate, when a sufficiently large number of MTC devices communicate with the MTC server, congestion may arise at the core network or at links connecting the core network and the MTC server. To prevent such congestion, the 3GPP standard suggests using group-based policing to regulate the maximum bit rate of all traffic generated by a group of MTC devices, as requirements for MTC communication. For example, FIG. 8 illustrates a group based policing used to regulate the maximum bit rate of all traffic generated by a group of MTC devices. Exemplary embodiments of the present invention provide a means enabling such group-based policing.

MTC devices, each sending a small amount of data in a short time, are considered in exemplary embodiments of the present invention. Such MTC devices use only non-GBR bearers. To regulate the maximum bit rate of all traffic generated by a group of MTC devices using non-GBR bearers, the concept of APN-AMBR is extended to that of group-APN-AMBR. That is, exemplary embodiments of the present invention provide that the group-APN-AMBR is a parameter that is used to regulate the maximum bit rate of all traffic generated by a group of MTC devices using non-GBR bearers. The group-APN-AMBR is configured when a group of MTC devices is formed.

In the group-based control method of the present invention, when a group-APN-AMBR is configured for a group of MTC devices, the sum of all APN-AMBRs of devices belonging to the MTC group is set so that it does not exceed the group-APN-AMBR.

Figure 1:
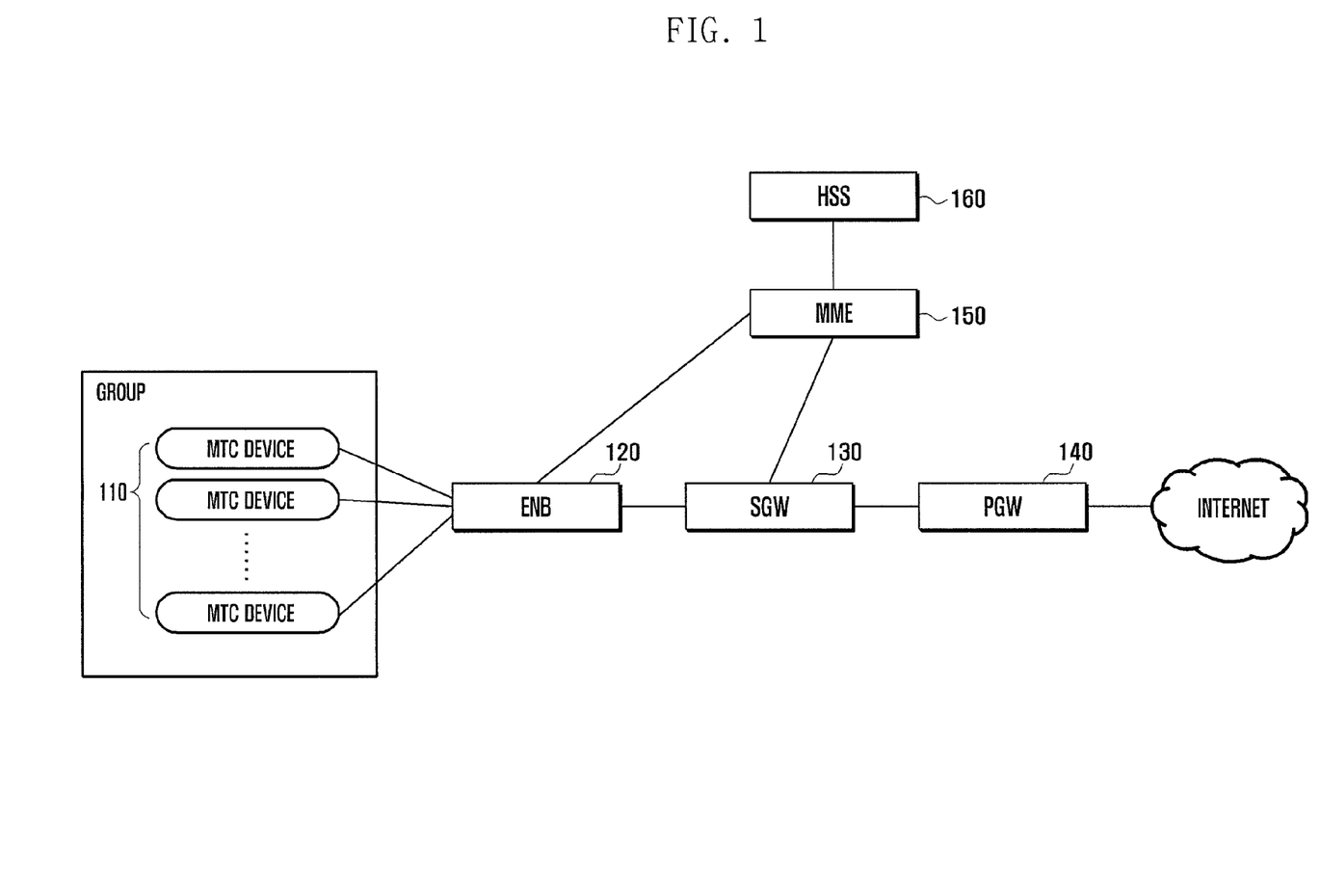
FIG. 1 illustrates an architecture of a mobile communication system according to an exemplary embodiment of the present invention.

FIG. 1 illustrates an architecture of a mobile communication system according to an exemplary embodiment of the present invention.

Referring to FIG. 1, the mobile communication system includes a group of MTC device 110, an evolved Node B (eNB) 120, a Serving Gateway (SGW) 130, a Packet data Network Gateway (PGW) 140, a Mobility Management Entity (MME) 150, and a Home Subscriber Server (HSS) 160.

With further reference to FIG. 1, according to an exemplary embodiment of the present invention, when a group of MTC devices 110 is formed, the network assigns a group-APN-AMBR to the group. The group-APN-AMBR indicates the maximum bit rate of all traffic that may be generated by a group of MTC devices connected to the same APN.

A base station such as, for example, the eNB 120 provides communication services to mobile or stationary terminals present in the coverage area of the eNB. In particular, the eNB 120 relays signaling and control messages between the MTC devices 110 and the network.

The SGW 130 acts as a mobility anchor for handover between eNBs or roaming between 3GPP radio networks. The SGW 130 handles bearer signaling between the MTC devices 110 or mobile terminals.

The PGW 140 is connected to the Internet. For example, the PGW 140 assigns IP addresses to the MTC devices 110 or mobile terminals, and handles packet data for the core network. The PGW 140 acts as a mobility anchor for roaming between 3GPP and non-3GPP radio networks, determines bands for bearers allocated to subscribers, and performs forwarding and routing of packet data.

The MME 150 manages terminals in the idle mode, and selects an SGW and a PGW. The MME 150 also performs operations needed for roaming and authentication.

In particular, when an MTC device 110 operated by an MTC application with a time controlled feature makes an attach attempt, the MME 150 sends a request for time period information related to the MTC device 110 to the HSS 160 when the grant time interval for the MTC device 110 is not known. As an example, time period information includes information on the grant time interval and forbidden time interval assigned to an MTC device 110. The MME 150 may change the grant time interval for an MTC device 110 according to preset criteria for network overload. The MME 150 receives an attach request from an MTC device 110 and sends an attach report corresponding to the attach request to the HSS 160. The MME 150 receives an APN-AMBR from the HSS 160, and forwards the APN-AMBR to other related entities (e.g., the MTC device, a mobile terminal, the SGW, and the PGW).

The HSS 160 manages information regarding subscribers to the communication network using, for example, a subscription list. In particular, for MTC communication, the HSS 160 may store information on regions, at which an MTC device 110 is allowed to access the network, as an allowed list.

According to an exemplary embodiment of the present invention, when a new attach report is received from the MME 150, the HSS 160 starts a timer lasting for a preset time duration. From the time at which the HSS 160 starts the timer until expiration of the timer, the HSS 160 counts the number of MTC devices requesting attachment and counts the number of already attached MTC devices belonging to the MTC group. The HSS 160 determines an APN-AMBR. For example, the HSS 160 may determine the APN-AMBR by dividing the group-APN-AMBR assigned to the MTC group by the number of counted MTC devices. The HSS 160 forwards the determined APN-AMBR to related network entities.

Figure 2:
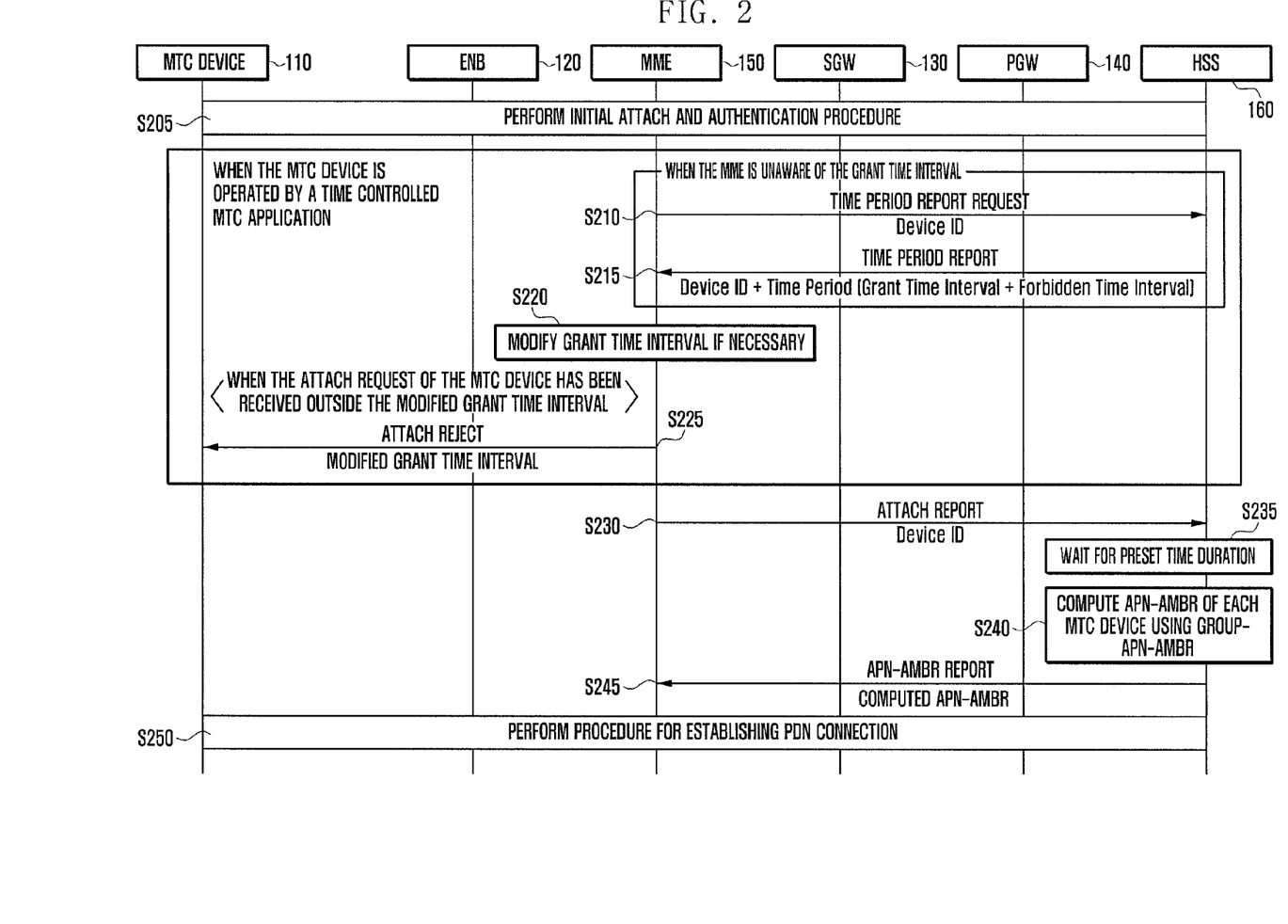
FIG. 2 is a sequence diagram of a group-based method for regulating a bit rate of a Machine Type Communication (MTC) device in the mobile communication system according to an exemplary embodiment of the present invention.

FIG. 2 is a sequence diagram of a group-based method for regulating a bit rate of an MTC device according to an exemplary embodiment of the present invention.

Referring to FIG. 2, a mobile communication system includes an MTC device 110, an eNB 120, a SGW 130, a PGW 140, a MME 150, and a HSS 160.

With further reference to FIG. 2, an MTC device 110 performs an initial attach procedure and an authentication procedure with the mobile communication network at step S205. As an example, in the initial attach procedure, the MTC device 110 sends an attach request through the eNB 120 to the MME 150. The MTC device 110 performs the authentication procedure with the MME 150.

When the MTC device 110 is operated by a time controlled MTC application, the MTC device 110 includes information on the grant time interval and performs the attach procedure only during the grant time interval.

The MME 150 may not have context information on the MTC device 110, which is operated by a time controlled MTC application and which has made an initial attach request. The context information includes information on the grant time interval and the forbidden time interval assigned to the MTC device 110. When the MME 150 does not have context information on the MTC device 110, the MME 150 is unaware of the grant time interval and forbidden time interval assigned thereto.

When time period information of the MTC device 110 is not known, the MME 150 sends a time period report request to the HSS 160 at step S210. As an example, the time period report request may include a device ID corresponding to the MTC device 110 making an initial attach request.

The HSS 160 includes information on the MTC group to which the MTC device 110 belongs, such as, for example, group ID and device IDs corresponding to devices in the MTC group. The HSS 160 also includes time period information (e.g., grant time interval and forbidden time interval) of MTC devices 110 operated by time controlled MTC applications.

Upon reception of the time period report request from the MME 150, the HSS 160 finds the grant time interval and forbidden time interval of the MTC device 110. The HSS 160 sends a time period report including the device ID and time period information of the MTC device 110 to the MME 150 at step S215.

The MME 150 determines whether modification of the grant time interval is necessary (for example, signaling overhead), and modifies the grant time interval if necessary at step S220. The MME 150 determines whether the attach request from the MTC device 110 has been received within the grant time interval. When the attach request has been received outside the grant time interval, the MME 150 sends an attach reject message to the MTC device 110 at step S225. As an example, the attach reject message includes information on the modified grant time interval.

When an attach reject message is received, the MTC device 110 may send an attach request during the modified grant time interval.

As an example, steps S210 to S225 are selectively performed when the MTC device 110 is operated by a time controlled MTC application.

Upon reception of the attach request from the MTC device 110, the MME 150 sends an attach report to the HSS 160 at step S230. Here, the attach report includes the device ID of the MTC device 110.

When the received attach report corresponds to an initial attach report, the HSS 160 waits for a preset time duration by starting a timer at step S235. From the time at which the HSS 160 starts the timer until expiration of the timer, the HSS 160 counts the number of MTC devices requesting attachment and counts the number of already attached MTC devices in the MTC group. After expiration of the timer, the HSS 160 determines an APN-AMBR at step S240. For example, the HSS 160 may determine the APN-AMBR by dividing the group-APN-AMBR assigned to the MTC group by the number of counted MTC devices.

The HSS 160 sends an APN-AMBR report including the determined APN-AMBR to the MME 150 at step S245. Thereafter, the MME 150 forwards the determined APN-AMBR to related entities including the MTC device 110, the eNB 120, and the PGW 140.

The MTC device 110 performs a procedure for establishing a Packet Data Network (PDN) connection at step S250, and performs subsequent operations.

As described above, APN-AMBRs of all devices belonging to an MTC group can be set so that the sum of APN-AMBRs does not exceed the group-APN-AMBR assigned to the MTC group. Hence, network congestion may be effectively controlled.

Figure 3:
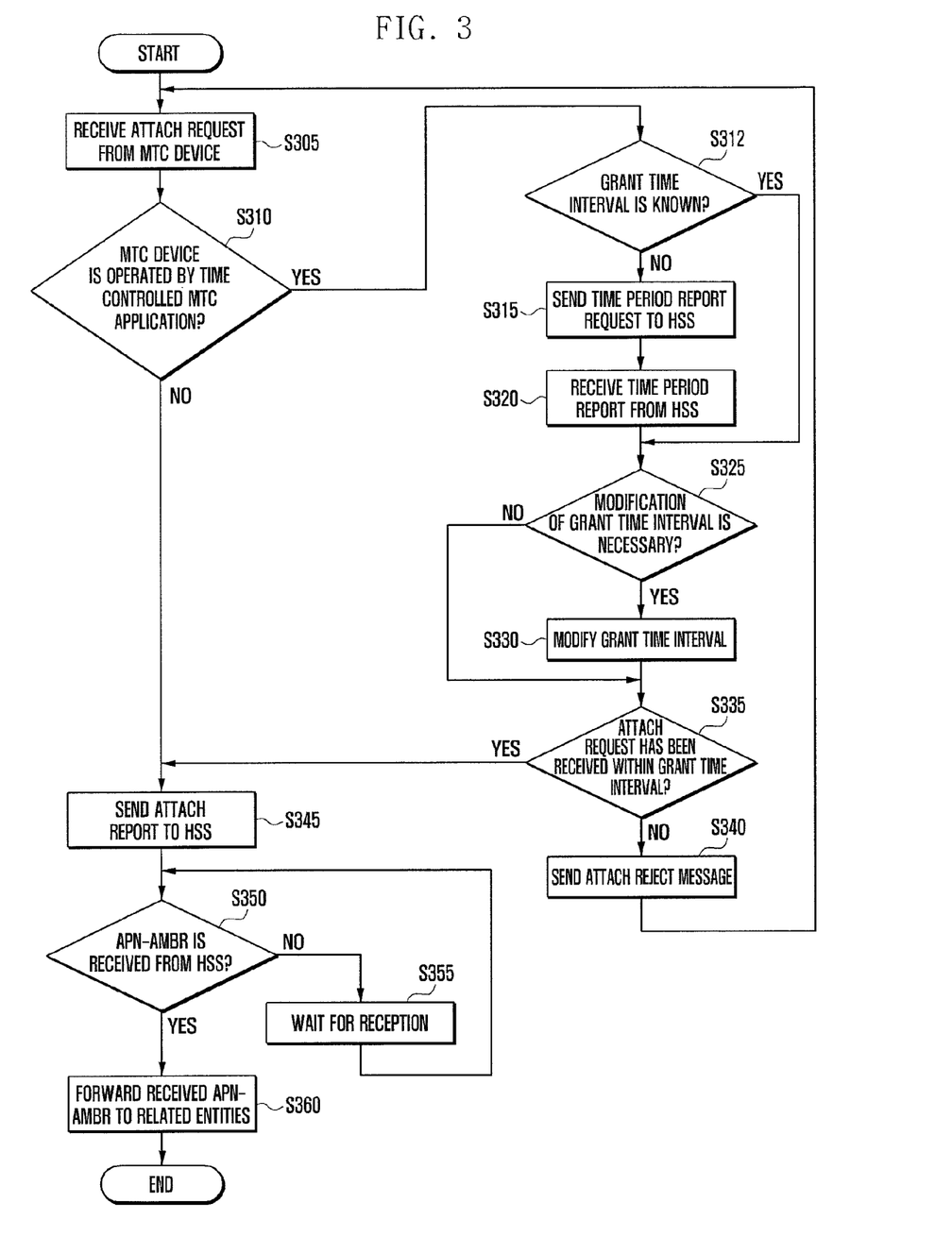
FIG. 3 is a flowchart of a procedure performed by a Mobility Management Entity (MME) according to an exemplary embodiment of the present invention.

FIG. 3 is a flowchart of a procedure performed by an MME according to an exemplary embodiment of the present invention.

Referring to FIG. 3, the MME 150 receives an attach request from an MTC device 110 at step S305. The MME 150 determines whether the MTC device 110 requesting attachment is operated by a time controlled MTC application at step S310.

When the MTC device 110 requesting attachment is operated by a time controlled MTC application, the MME 150 determines whether the grant time interval of the MTC device 110 is known at step S312. When the grant time interval of the MTC device 110 is not known, the MME 150 sends a time period report request to the HSS 160 at step S315, and receives a time period report from the HSS 160 and extracts information on the grant time interval and forbidden time interval for the MTC device 110 from the time period report at step S320.

The MME 150 determines whether modification of the grant time interval of the MTC device 110 is necessary in consideration of traffic conditions at step S325. When modification of the grant time interval is necessary, the MME 150 modifies the grant time interval of the MTC device 110 at step S330. For example, the modified grant time interval may be commonly applied to devices associated with the MME 150 among devices in an MTC group to which the MTC device 110 belongs.

The MME 150 determines whether the attach request from the MTC device 110 has been received within the grant time interval at step S335. When the attach request from the MTC device 110 has been received within the grant time interval, the MME 150 proceeds to step S345. When the attach request has been received outside the grant time interval, the MME 150 sends an attach reject message to the MTC device 110 at step S340. Here, the attach reject message includes information on the modified grant time interval, so that the MTC device 110 may send an attach request during the modified grant time interval.

When the MTC device 110 requesting attachment is operated by a non-time controlled MTC application or the attach request from the MTC device 110 operated by a time controlled MTC application has been received within the grant time interval, the MME 150 sends an attach report to the HSS 160 at step S345. Here, the attach report notifies the HSS 160 that the MTC device 110 has made an attach request. The HSS 160 may count the number of MTC devices requesting attachment on the basis of the attach report.

After sending the attach report, the MME 150 determines whether an APN-AMBR is received from the HSS 160 at step S350. When an APN-AMBR is not received, the MME 150 waits for reception of an APN-AMBR at step S355.

When an APN-AMBR is received, the MME 150 forwards the received APN-AMBR to related network entities at step S360. For example, the APN-AMBR may be sent to the MTC device 110, the eNB 120 and/or the PGW 140.

Figure 4:
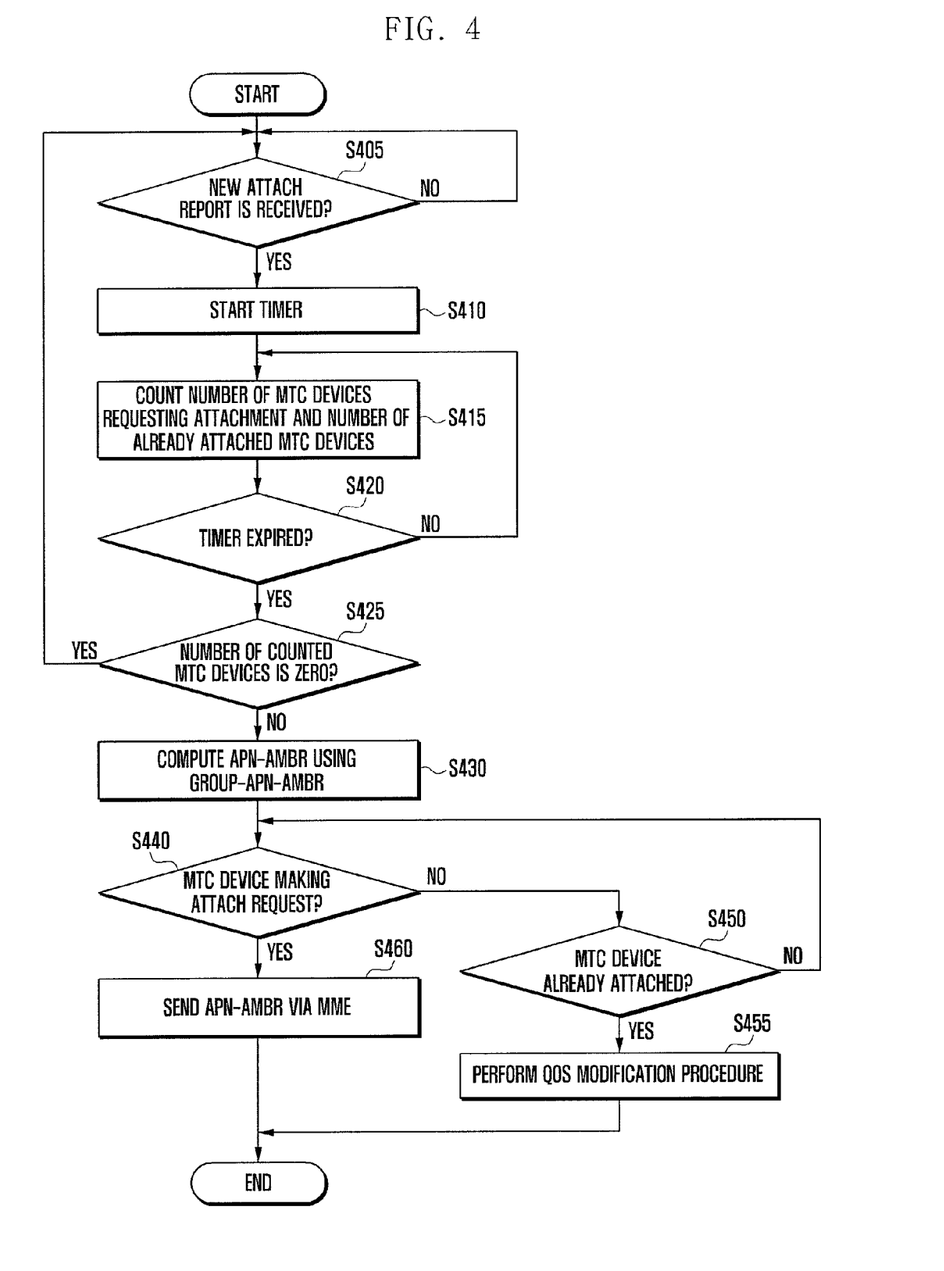
FIG. 4 is a flowchart of a procedure performed by a Home Subscriber Server (HSS) according to an exemplary embodiment of the present invention.

FIG. 4 is a flowchart of a procedure performed by a HSS according to an exemplary embodiment of the present invention.

Referring to FIG. 4, the HSS 160 determines whether a new attach report is received from the MME 150 at step S405. As an example, a new attach report refers to an attach report that is received for the first time before a timer is started. When a new attach report is received, the HSS 160 resets a timer at step S410. The HSS 160 starts the timer when a new attach report is received.

The HSS 160 counts the number of MTC devices requesting attachment and the number of already attached MTC devices in the MTC group at step S415. For example, the HSS 160 may count the number of MTC devices requesting attachment on the basis of the number of attach reports from the MME 150 (e.g., attach reports corresponds to attach requests from MTC devices in the group). As an example, the HSS 160 may count the number of MTC devices that have not performed a detach procedure after attachment as the number of already attached MTC devices (or the number of transmitting MTC devices).

The HSS 160 determines whether the timer has expired at step S420. When the timer has not yet expired, the HSS 160 returns to step S415 and continues device counting.

Upon expiration of the timer, the HSS 160 determines whether the number of counted MTC devices is zero at step S425. The attach procedures performed MTC devices may be aborted early owing to radio environment conditions. As an example, the number of counted MTC devices may be zero. When the number of counted MTC devices is zero, the HSS 160 returns to step S405.

When the number of counted MTC devices is non-zero, the HSS 160 determines an APN-AMBR using the group-APN-AMBR at step S430. The APN-AMBR can be represented by Equation 1.

$$\text{APN-AMBR} = \text{group-APN-AMBR}/(\text{the number of MTC devices requesting attachment} + \text{the number of already attached MTC devices}) \quad (1)$$

Referring to Equation 1, the group-APN-AMBR is a value assigned to a specific MTC group by the network. For example, the HSS 160 pre-stores group-APN-AMBRs assigned to individual MTC groups.

At step S440 and subsequent steps, the HSS 160 forwards the determined APN-AMBR to related network entities. The HSS 160 may perform different operations according to states of MTC devices to which the APN-AMBR is to be delivered.

That is, the HSS 160 determines whether an MTC device to which the APN-AMBR is to be delivered is making an attach request at step S440. When the MTC device to which the APN-AMBR is to be delivered is making an attach request, the HSS 160 sends an APN-AMBR report including the determined APN-AMBR to the MME 150 at step S460. Thereafter, the MME 150 performs a procedure for establishing a PDN connection with the MTC device, and forwards the APN-AMBR to the MTC device and related entities.

When the MTC device to which the APN-AMBR is to be delivered is not making an attach request, the HSS 160 determines whether the MTC device is already attached for transmission at step S450. When the MTC device is already attached, the HSS 160 determines whether the determined (e.g., computed) APN-AMBR is equal to the APN-AMBR assigned to the already attached MTC device. When the determined APN-AMBR is equal to the APN-AMBR assigned to the already attached MTC device, the HSS 160 need not separately forward the determined APN-AMBR to the MTC device and related entities.

When the determined APN-AMBR is equal to the APN-AMBR assigned to the already attached MTC device, the HSS 160 forwards the determined APN-AMBR to the MTC device and related entities through a QoS modification procedure at step S455. For example, the QoS modification procedure may be the "HSS initiated subscribed QoS modification procedure" specified by 3GPP.

Figure 5:
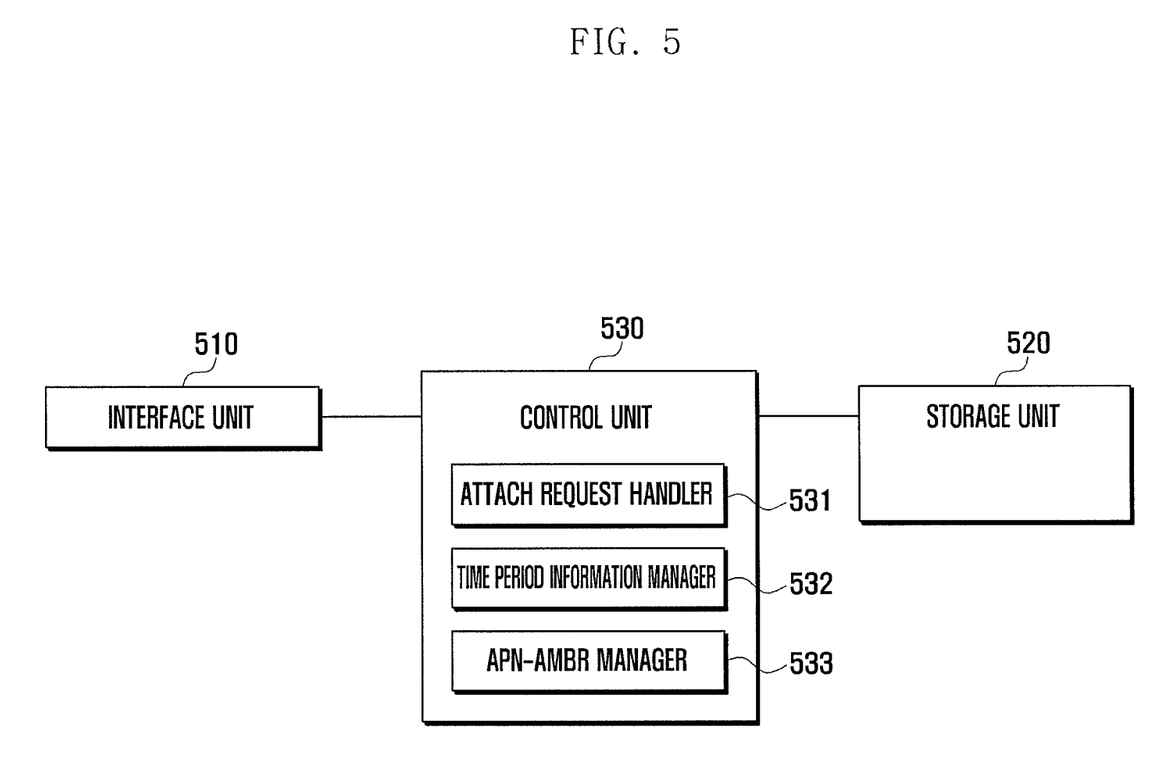
FIG. 5 is a block diagram of an MME according to an exemplary embodiment of the present invention.

FIG. 5 is a block diagram of an MME according to an exemplary embodiment of the present invention.

Referring to FIG. 5, the MME 150 may include an interface unit 510, a storage unit 520, and a control unit 530.

The interface unit 510 provides interfaces to send and receive control signals, data, and messages to and from the eNB 120, the SGW 130 and the HSS 160.

The storage unit 520 stores various programs and data associated with operation of the MME 150.

The control unit 530 controls the overall operation of the MME 150, and processes control signals and messages from other network entities. For example, to achieve this, the control unit 530 may include an attach request handler 531, a time period information manager 532, and an APN-AMBR manager 533.

The attach request handler 531 creates an attach report to be sent to the HSS 160. For example, the attach request handler 531 may create the attach report upon reception of an attach request from an MTC device 110. The attach report includes a device ID of the MTC device 110 having sent an attach request. The attach request handler 531 controls the interface unit 510 to transmit the created attach report to the HSS 160.

The time period information manager 532 determines whether the MTC device 110 having sent an attach request is operated by a time controlled MTC application. When the MTC device 110 is operated by a time controlled MTC application, the time period information manager 532 determines whether time period information (e.g., the grant time interval and the forbidden time interval) of the MTC device 110 is known. When time period information of the MTC device 110 is not known, the time period information manager 532 sends a time period report request to the HSS 160 to obtain the time period information of the MTC device 110.

The APN-AMBR manager 533 forwards an APN-AMBR from the HSS 160 to related network entities such as an MTC device 110, an eNB 120 and a PGW 140. In exemplary embodiments of the present invention, the APN-AMBR is sent to an MTC device 110 requesting attachment by means of a PDN connection establishment procedure. The APN-AMBR is sent to an MTC device 110 already attached for transmission by means of a QoS modification procedure such as, for example, the "HSS initiated subscribed QoS modification procedure" provided by 3GPP.

Figure 6:
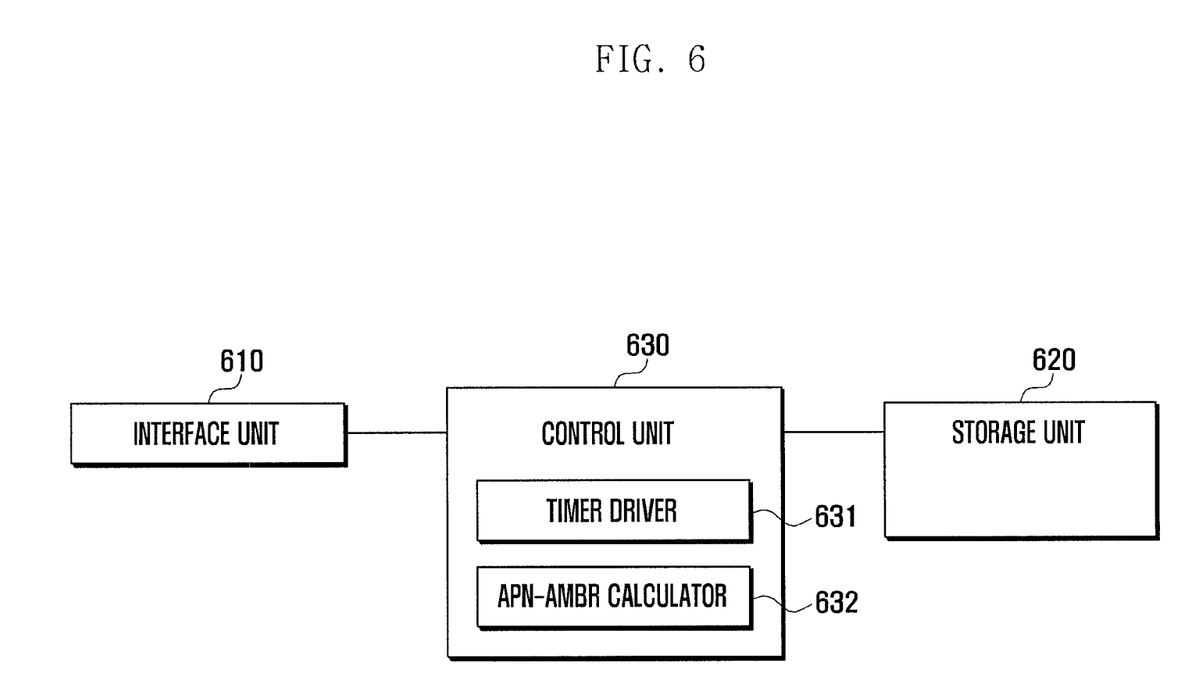
FIG. 6 is a block diagram of a HSS according to an exemplary embodiment of the present invention.

FIG. 6 is a block diagram of an HSS 160 according to an exemplary embodiment of the present invention.

Referring to FIG. 6, the HSS 160 may include an interface unit 610, a storage unit 620, and a control unit 630.

The interface unit 610 provides an interface to send and receive control signals, data and messages to and from the MME 150.

The storage unit 620 stores various programs and data associated with operation of the HSS 160. In particular, the storage unit 620 may store subscription information of MTC devices, group-APN-AMBRs assigned to individual groups of MTC devices, and time period information of MTC devices with a time controlled feature.

The control unit 630 controls the overall operation of the HSS 160, and processes control signals and messages from other network entities. For example, to achieve this, the control unit 630 may include a timer driver 631, and an APN-AMBR calculator 632.

The timer driver 631 sets a preset time duration to a timer when a new attach report is received from the MME 150. When the timer lasts for a long time, the APN-AMBR becomes smaller as the number of MTC devices requesting attachment increases. When the timer expires, a QoS modification procedure has to be performed for each MTC device already attached for transmission. When the timer lasts for a long time, among MTC devices already attached for transmission, the number of MTC devices that transition from the attached state to the detached state may increase. Hence, setting a relatively long time duration to the timer may decrease the execution frequency of the QoS modification procedure, thereby reducing signaling overhead.

The APN-AMBR calculator 632 counts the number of MTC devices requesting attachment and the number of already attached MTC devices for transmission during the time duration of the timer. After expiration of the timer, the APN-AMBR calculator 632 divides the group-APN-AMBR assigned to the MTC group by the number of counted MTC devices to produce an APN-AMBR. The APN-AMBR calculator 632 forwards the determined APN-AMBR to related network entities.

In the above description, the control unit of the MME 150 or the HSS 160 includes various separate components with different functions. However, such configuration is only for ease of description. For example, according to an exemplary embodiment of the present invention, in the MME 150, the function of the attach request handler 531 may be directly performed by the control unit 530 itself.

As described above, the maximum bit rate of all traffic generated by a group of MTC devices can be controlled by determining the aggregate maximum bit rate of each MTC device according to the number of MTC devices requesting attachment and the number of already attached MTC devices in the MTC group.

According to exemplary embodiments of the present invention, the maximum bit rate generated by a group of MTC devices can be regulated by assigning an aggregate maximum bit rate to each device in the MTC group in consideration of the number of devices requesting attachment and the number of already attached devices in the MTC group. Hence, network congestion due to MTC devices may be effectively avoided.

FIGS. 7 and 8 illustrate a comparison between an APN-AMBR and a group-APN-AMBR according to an exemplary embodiment of the present invention.

Referring to FIG. 7, APN-AMBR of various PDN connections is illustrated. For example, FIG. 7 illustrates an APN-AMBR of two terminals (e.g., Terminal 1 and Terminal 2) connected to the same APN (e.g., APN 1) which are connected via a corresponding PDN connection (e.g., PDN Connection 1 and PDN Connection 2). As illustrated, the total bit rate of traffic generated through all non-GBR bearers connected to the same APN is regulated.

Referring to FIG. 8, a group APN-AMBR is illustrated. For example, FIG. 8 illustrates a group APN-AMBR of a group of MTC devices (e.g. First MTC Device, and Second MTC Device). Both the First MTC Device and the Second MTC Device are connected to the same APN (e.g., APN 1). Further, both the First MTC Device and the Second MTC Device are connected to APN 1 via the same PDN connection (e.g., PDN Connection 1). As illustrated, a group based policing is used to regulate the maximum bit rate of all traffic generated by a group of MTC devices.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of controlling Machine Type Communication (MTC) devices for a Home Subscriber Server (HSS) in a mobile communication system, the method comprising:
receiving an attach report of an MTC device from a Mobility Management Entity (MME);
starting, upon reception of the attach report, a timer lasting for a preset time duration,
counting a number of MTC devices requesting attachment and a number of already attached MTC devices during the preset time duration;
determining, upon expiration of the timer, an Access Point Name-Aggregate Maximum Bit Rate (APN-AMBR) according to a sum of the counted number of MTC devices requesting attachment during the preset time duration and the counted number of already attached MTC devices; and
sending the determined APN-ABMR to the MME,
wherein, the determining the APN-AMBR comprises:
dividing a group-APN-AMBR assigned to an MTC group to which the MTC device belongs by the sum of the counted number of MTC devices requesting attachment during the preset time duration and the counted number of already attached MTC devices.

2. The method of claim 1, further comprising:
forwarding the APN-AMBR to the MTC device requesting attachment using a procedure for establishing a Packet Data Network (PDN) connection.

3. The method of claim 1, further comprising forwarding the APN-AMBR to an already attached MTC device using a Quality of Service (QoS) modification procedure.

4. A Mobility Management Entity (MME) for controlling Machine Type Communication (MTC) devices in a mobile communication system, the MME comprising:
an interface unit providing an interface to communicate with an evolved Node B (eNB), a Serving Gateway (SGW) and a Home Subscriber Server (HSS); and
a control unit controlling the interface unit to send, when an attach request from an MTC device is received, an attach report to the HSS, to receive an Access Point Name Aggregate Maximum Bit Rate (APN-AMBR) from the HSS, and to forward the received APN-AMBR to related entities,
wherein the APN-AMBR is determined by dividing a group-APN-AMBR assigned to an MTC group to which the MTC device belongs by a sum of the counted number of MTC devices requesting attachment during the preset time duration and the counted number of already attached MTC devices and is used for controlling a network congestion by setting a sum of APN-AMBRs does not exceed the group-APN-AMBR assigned to the MTC group.

5. The Mobility Management Entity of claim 4, wherein the control unit further:
determines whether the MTC device having sent the attach request is operated by a time controlled MTC application,
determines, when the MTC device having sent the attach request is operated by a time controlled MTC application, whether time period information of the MTC device is stored,
operatively sends, when time period information of the MTC device is not stored, a request for time period information to the HSS, and
operatively receives the time period information from the HSS.

6. The Mobility Management Entity of claim 5, wherein the time period information comprises information associated with a grant time interval during which the MTC device is allowed to send data, and information associated with a forbidden time interval during which the MTC device is not allowed to send data.

7. The Mobility Management Entity of claim 6, wherein the control unit further:
determines whether modification of the grant time interval of the MTC device is necessary,
modifies, when modification of the grant time interval is determined to be necessary, the grant time interval such that the grant time interval does not overlap with the forbidden time interval, and
rejects, when the attach request from the MTC device is received outside the grant time interval, the attach request.

8. A Home Subscriber Server (HSS) for controlling Machine Type Communication (MTC) devices in a mobile communication system, the HSS comprising:
an interface unit providing an interface to communicate with a Mobility Management Entity (MME); and
a control unit controlling a process of starting, upon reception of an attach report from the MME, a timer lasting for a preset time duration, for counting a number of MTC devices requesting attachment and a number of already attached MTC devices during the preset time duration, determining, upon expiration of the timer, an Access Point Name-Aggregate Maximum Bit Rate (APN-AMBR) according to a sum of the counted number of MTC devices requesting attachment during the preset time duration and the counted number of already attached MTC devices, and sending the determined APN-ABMR to the MME, wherein the determining of the APN-AMBR further comprises dividing a group-APN-AMBR assigned to an MTC group to which the MTC device belongs by the sum of the determined number of counted MTC devices requesting attachment during the preset time duration and the counted number of already attached MTC devices.

9. The Home Subscriber Server of claim 8, wherein the control unit further operatively controls an operation to forward the APN-AMBR to an MTC device requesting attachment through a procedure for establishing a Packet Data Network (PDN) connection.

10. The Home Subscriber Server of claim 8, wherein the control unit further operatively controls an operation to forward the APN-AMBR to an already attached MTC device through a Quality of Service (QoS) modification procedure.

11. A method of controlling Machine Type Communication (MTC) devices for a Mobility Management Entity (MME) in a mobile communication system, the method comprising:

sending, when an attach request from an MTC device is received, an attach report to a Home Subscriber Server (HSS); and receiving, an Access Point Name-Aggregate Maximum Bit Rate (APN-AMBR) determined by the HSS according to a sum of the counted number of MTC devices requesting attachment during the preset time duration and the counted number of already attached MTC devices from the HSS;

wherein the APN-AMBR is determined by dividing a group-APN-AMBR assigned to an MTC group to which the MTC device belongs by the sum of the counted number of MTC devices requesting attachment during the preset time duration and the counted number of already attached MTC devices and is used for controlling a network congestion by setting the sum of APN-AMBRs does not exceed the group-APN-AMBR assigned to the MTC group.

12. The method of claim 11, further comprising:

determining whether the MTC device having sent the attach request is operated by a time controlled MTC application;

determining, when the MTC device having sent the attach request is operated by a time controlled MTC application, whether time period information of the MTC device is stored in the MME;

sending, when time period information of the MTC device having sent the attach request is not stored, a time period report request to the HSS; and obtaining the time period information after receiving a time period report from the HSS.

13. The method of claim 12, wherein the time period information comprises information associated with a grant time interval during which the MTC device is allowed to send data, and information associated with a forbidden time interval during which the MTC device is not allowed to send data.

14. The method of claim 13, further comprising:

determining, after obtaining the time period information, whether modification of the grant time interval of the MTC device is necessary;

modifying, when modification of the grant time interval is determined to be necessary, the grant time interval such that the grant time interval does not overlap with the forbidden time interval; and rejecting, when the attach request from the MTC device is received outside the grant time interval, the attach request.

\* \* \* \* \*